Frederick J. Lewis
INVENTOR.

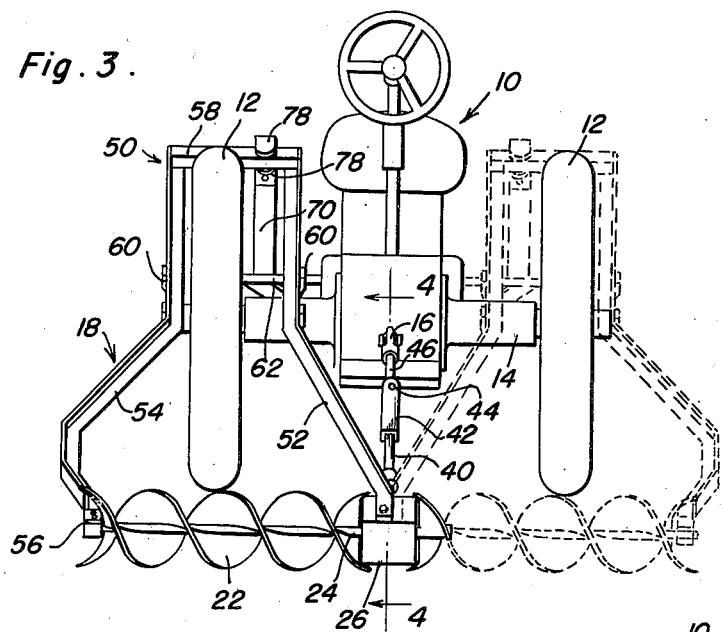
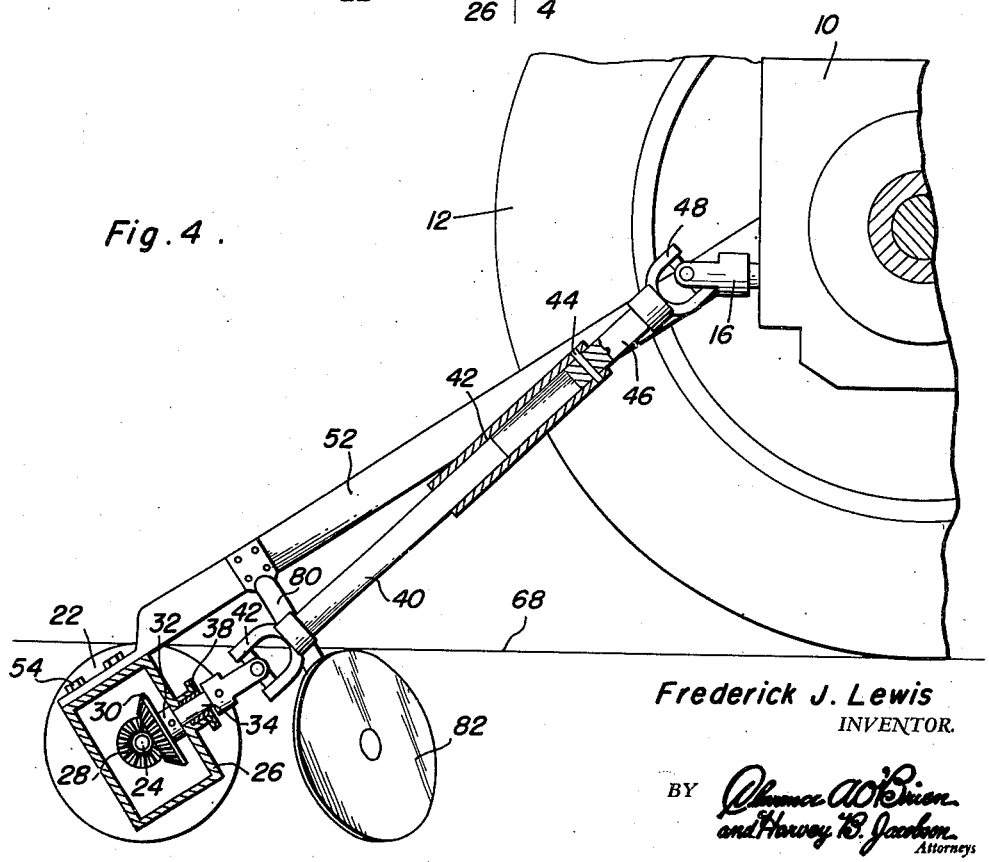
Frederick J. Lewis
INVENTOR.

Patented Apr. 3, 1951

2,547,585

UNITED STATES PATENT OFFICE 2,547,585

MECHANISM FOR SECURING AN EARTH-WORKING TOOL IN A GROUND-ENGAGING OR GROUND-DISENGAGING POSITION

Frederick J. Lewis, Youngstown, Ohio

Application July 20, 1948, Serial No. 39,610

3 Claims. (Cl. 97—41)

This invention relates to a novel agricultural implement principally for attachment to motor vehicles and tractors to cultivate and sow the soil.

A principal object of this invention is to provide a soil cultivator including a cutter having helical blades which is pivotally mounted upon the rear axle of a tractor or the like and which is provided with means for either retaining the cutter in an elevated or inoperative position or resiliently retaining the cutter in a lowered or operative position in such a manner that the cutter will cultivate and till even and uneven ground.

Yet another object of this invention is to provide a novel cultivator having a cutter including helical blades which cutter is driven by the power take-off of a tractor and is additionally provided with means for allowing for length variance in radial movement upon raising or lowering the cutter.

A still further object of this invention is to provide a novel cultivator for attachment to tractors and the like which includes a cutter having helical blades and a gear box enclosing several gears associated with the linkage in the connecting of the power take-off of the tractor and the cutter, and means for supporting the gear box in such an elevated position and to minimize resistance to afford movement of the gear box and cutter through the soil when the latter is being tilled.

These, together with various ancillary objects and features of the invention which will later become apparent as the following description proceeds, are attained by the device, a preferred embodiment of which has been illustrated by way of example only in the accompanying drawings, wherein:

Figure 3 is a rear elevational view of the cultivator shown in Figure 1; and,

Figure 4 is a sectional view taken substantially on the plane of section line 4—4 of Figure 3.

Specific reference is now made to the drawings. In the several views in the accompanying drawings and in the following specification reference characters indicate corresponding elements throughout.

Figure 1:
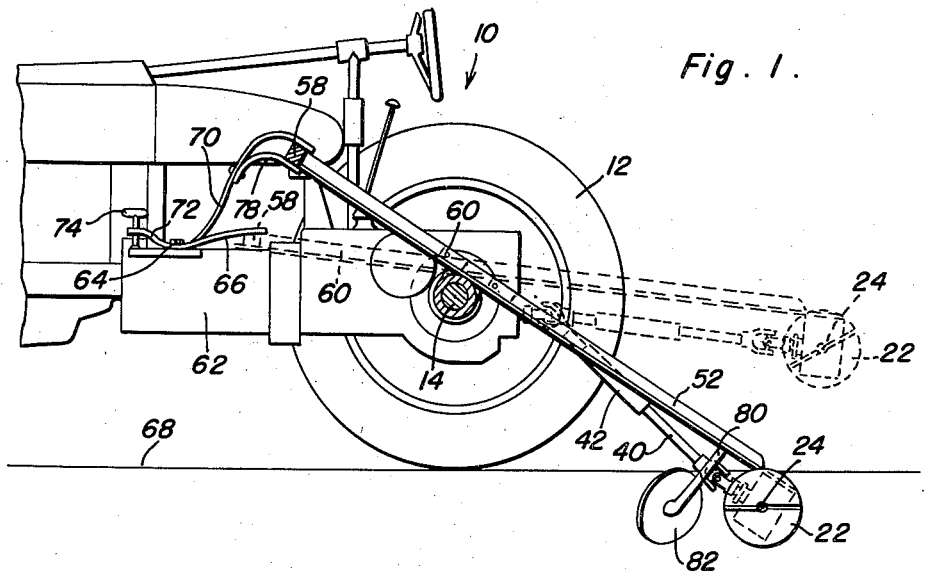
Figure 1 is a side elevational view of the cultivator of the instant invention and attached to a tractor.

Indicated generally at 10 is a conventional farm tractor having the usual large rear wheels 12 interconnected by means of the usual axle 14 and being additionally provided with a rear power take-off 16. The cultivator of the instant invention is shown generally at 18, the dotted lines shown in Figures 1 to 3 indicating that an additional cultivator may be employed together with the one shown at numeral 18.

The cultivator of the instant invention consists of a cutter 20 including helical blades 22 and a shaft 24 extending through a substantially rectangular gear box 26 and carrying at the end extending into the gear box an appropriate toothed gear 28 rotatable with the shaft.

Enmeshing with the gear 28 is a bevel gear 30, see Figure 4, which is secured by means of a collar 32, to a link 34 extending through an appropriate aperture in the gear box, about which aperture is provided a suitable journal bearing 38. The link 34 is secured to the bottom end of a squared shaft 40 by means of an appropriate universal joint or connection 42. The squared shaft 40 is slidably retained in a substantially rectangular sleeve member 42 which sleeve member is in turn secured by means of an appropriate pin 44 to another rod 46 which is in turn secured to the power take-off 16 by means of another suitable universal joint 48. Thus it will be seen that the cutter derives transmitted power from the power take-off 16 and the sleeve 42 allows length variance in radial movement upon raising or lowering the cutter.

Figure 2:
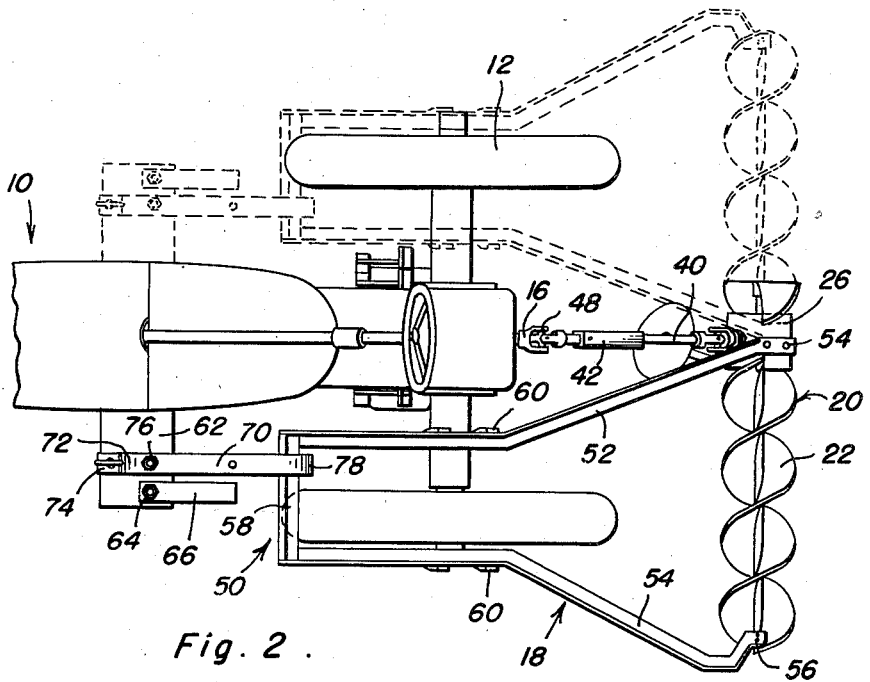
Figure 2 is a top plan view of the cultivator shown in Figure 1.

A frame member 50 is provided which pivotally secures the cutter to the tractor and consists essentially of a side member 52 which is secured at its lower end by means of rivets 54 to the gear box 26 and which is configurated as shown especially in Figures 2 and 3. A similar or complementary side member 56 is provided which is secured at its rear end as at 57 to the end of the cutter opposite the gear box. The forward end of the side members 52 and 56 are interconnected by means of a transverse bar 58 preferably in the form of an angle iron. Intermediate the ends of the side members 52 and 56 a pair of the U-shaped retaining members 60 are provided whose leg portions are bolted to the side members and whose web portion engages the rear axle 14 for pivoting the frame member 15 upon the axle 14. It is to be understood that it may be more practical to pivot the side members 52 and 56 upon the rear frame end of a motor vehicle.

Secured to the frame 62 of the tractor by means of an appropriate bolt 64 is a rearwardly and upwardly inclined arm 66 for retaining between the undersurface of the free end thereof and the tractor frame 62 a portion of the transverse bar 58 of the frame member. In this position, the cutter is elevated in an inoperative position above the ground 68 as shown in dotted lines in Figure 1.

Also secured to the frame 62 adjacent the arm 66 is an upwardly and rearwardly extending arcuated leaf spring 70, the forward end of which is provided with an upwardly and forwardly bent extension 72 having an internally threaded aperture for receiving a screw 74 extending to the frame 62, see Figure 1. Thus, by merely turning the screw as desired, the tension on the leaf spring can be varied, since the latter is secured to the frame 62 by means of an appropriate bolt 76 adjacent the extension 72. The rear end of the leaf spring 70 is additionally provided with a spring clip 78 for resiliently retaining the transverse bar 58 in the clip. In this position, the cutter is in operative engagement with the soil as shown in solid lines in Figure 1.

To minimize resistance of the gear box 26 in the ground 68, a rod 80 is secured to the side member 52 adjacent and in front of the gear box, to the free end of which rod is secured a guard disk 82.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a tractor having a frame and a rear axle housing, an elongated cutter and means for suspending the cutter from the tractor, said means including a substantially U-shaped frame secured at its free ends to the ends of said cutter, clamp means intermediate the ends of the legs of said cutter frame pivotally securing the latter to the rear axle housing, and means carried by the tractor frame for releasably and selectively retaining said cutter in ground-engaging and ground-disengaging positions, said last means including an upwardly and rearwardly extending arcuate leaf spring secured intermediate its ends to the tractor frame, the upper end of said spring including a clip for frictionally engaging the web portion of said cutter frame to retain the cutter in a ground-engaging position.

2. The combination of claim 1 and a rearwardly and upwardly inclined arm secured at one of its ends to the tractor frame, the web portion of said cutter frame adapted to be retained between said arm and the tractor frame to hold the cutter in a ground-disengaging position.

3. The combination of claim 2 and a means for adjustably tensioning said leaf spring.

FREDERICK J. LEWIS.

REFERENCES CITED

The following references are of record in the file of this patent:

UNITED STATES PATENTS

| Number | Name | Date |
| --- | --- | --- |
| 1,744,170 | Lajeunesse | Jan. 21, 1930 |
| 1,819,544 | Dech | Aug. 18, 1931 |
| 2,379,469 | Bagan | July 3, 1945 |